United States Patent [19]

Mizuno et al.

[11] Patent Number: 4,674,420
[45] Date of Patent: Jun. 23, 1987

[54] EMBROIDERY MACHINE CONTROL DEVICE HAVING MEANS TO INPUT NEW CHARACTER PATTERNS INTO A PRE-PROGRAMMED SERIES OF PATTERNS

[75] Inventors: Takashi Mizuno; Akihiro Kobayashi, both of Chofu, Japan

[73] Assignee: Tokyo Juki Industrial Co., Ltd., Tokyo, Japan

[21] Appl. No.: 915,123

[22] Filed: Oct. 3, 1986

[30] Foreign Application Priority Data

Oct. 4, 1985 [JP] Japan .............................. 60-221621

[51] Int. Cl.⁴ .............................................. D05C 5/02
[52] U.S. Cl. .................................... 112/78; 112/454; 112/457; 112/121.12; 364/400; 364/470
[58] Field of Search ............... 112/454, 457, 458, 453, 112/78, 86, 103, 121.12, 266.1; 364/400, 470

[56] References Cited

U.S. PATENT DOCUMENTS

| 4,200,048 | 4/1980 | Makabe et al. ..................... 112/454 |
| 4,499,836 | 2/1985 | Meier et al. ..................... 112/454 X |
| 4,622,907 | 11/1986 | Kimura ........................... 112/121.12 |

*Primary Examiner*—Peter Nerbun
*Attorney, Agent, or Firm*—Morgan & Finnegan

[57] ABSTRACT

An automatic embroidery machine capable of switching to stitch urgently required patterns although the machine is scheduled to stitch patterns previously input through a central processing unit from random access memory. The urgently required patterns are given priority by input of a priority code, a discrimination code corresponding to the required pattern, a stop code, etc., during current stitch work.

1 Claim, 4 Drawing Figures

EMBROIDERY MACHINE CONTROL DEVICE HAVING MEANS TO INPUT NEW CHARACTER PATTERNS INTO A PRE-PROGRAMMED SERIES OF PATTERNS

BACKGROUND OF THE INVENTION

This invention relates to automatic embroidery machines. More particularly, this invention relates to control devices for automatic embroidery machines.

In conventional embroidery machines which embroider characters automatically, a plurality of characters are regarded as one group and stop codes are used for stopping data detection. Many discrimination codes corresponding to the stitch data are input at the same time and stitch work according to the stitch data is performed, group by group, in order. Such types of embroidery machines are well known.

According to these embroidery machines, the stitch work is conducted in order of input. It is impossible to input new discrimination codes during current stitch work in order to perform new stitch work and, if the new stitch work is urgently required, such conventional embroidery machines are inconvenient.

SUMMARY OF THE INVENTION

With the foregoing in mind, it is an object of the invention to provide a new and improved control device for automatic embroidery machines.

In an embroidery machine which inputs a plurality of stitch codes at one time, uses a stop code which stops output, and stitches group by group as previously determined using the stop code, the embroidery machine performs stitch work according to an order number that may be input even after the stitching has started and is thus able to meet with any emergent stitch work requirements such as a new character to be stitched. Stitch work is performed in order of input order number even if the code was input after stitch work has started.

A preferred embodiment according to the invention comprises a storage means to store the stitch data attaching discrimination codes, a first reading means to read the stitch data from the storage means by discrimination codes and stop codes, a first memory means to store, group by group, the stitch data read by the first reading means, an operation means utilized by an operator to generate a priority signal, a second memory means to store the stitch data read from the storage means after the priority signal is generated, a second reading means to read the group of stitch data stored in the first memory means in the order it was read by the first reading means, a third reading means initialized by the priority signal to read out the stitch data from the second memory means when the preset group of stitch data is performed, and a stitch means to stitch in accordance with stitch data read out from each of the reading means.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

Figure 1:
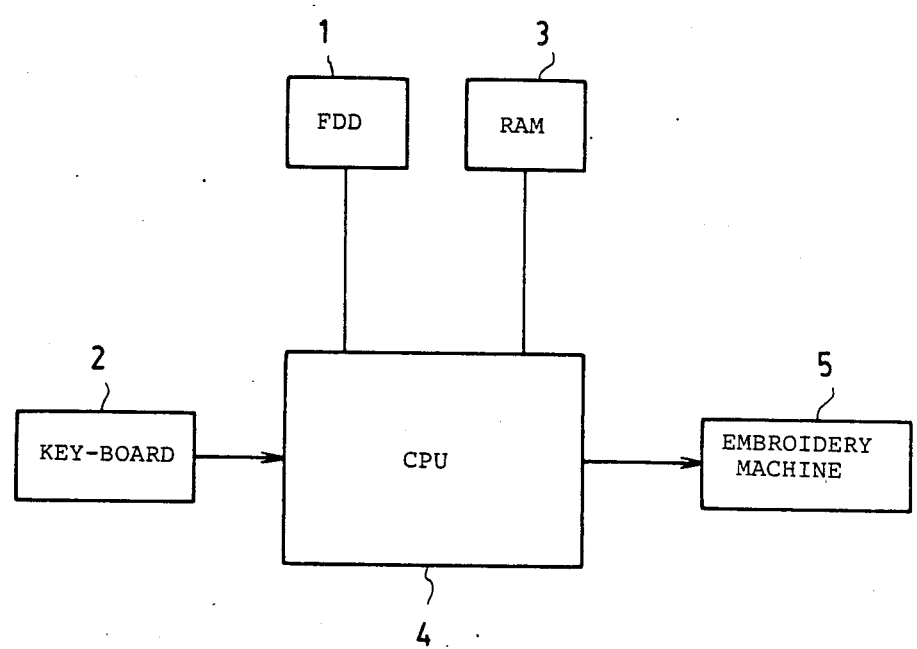
FIG. 1 is a schematic drawing according to one embodiment of the invention.
Figure 2:
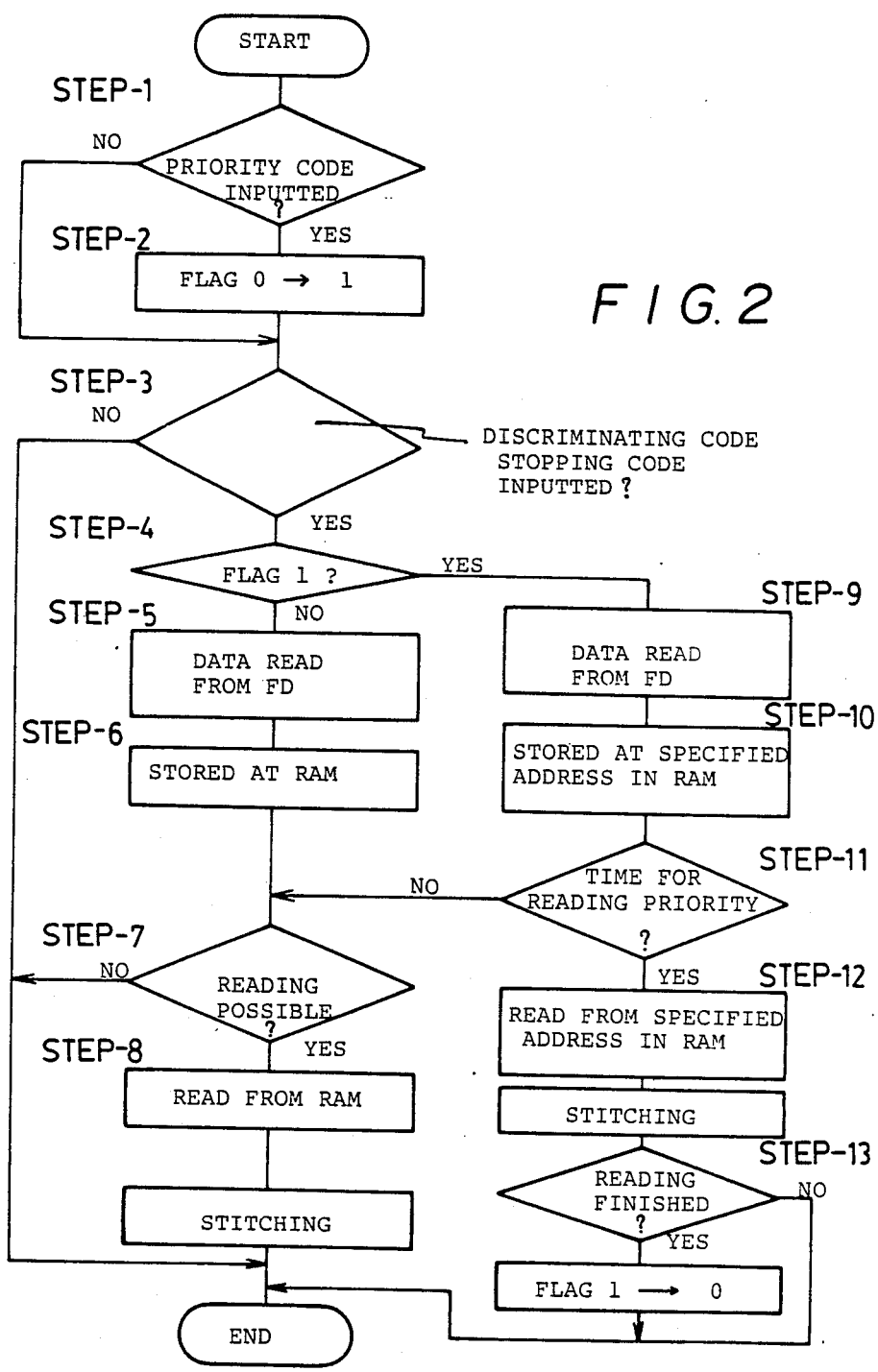
FIG. 2 is an operation flow chart according to one embodiment of the invention.

Referring to the accompanying drawings FIGS. 1 and 2, one preferred embodiment of the invention will be explained hereinafter. The numeral 1 denotes a floppy disc drive (FDD) which stores stitch data with attached discrimination codes. Numeral 2 denotes a keyboard which inputs the discrimination codes and stop codes to count a plurality of discrimination codes as one group. The period key (".") generates the stop code and the slash key ("/") generates the priority code.

The numeral 3 denotes a RAM (random access memory) which stores the discrimination codes and stop codes input from the keyboard 2 and the stitch data corresponding to each discrimination code. Numeral 4 denotes a CPU (central processing unit) which controls the input and reading as shown in the "flow chart" of FIG. 2. Numeral 5 denotes an embroidery machine.

Referring to the "flow chart" of FIG. 2, the operation of this embodiment according to the invention will be explained hereinafter. When a code input at the keyboard is a priority code, a priority flag changes from 0 to 1 (steps 1,2). When a discrimination code or a stop code is input (step 3) and the flag is 0, i.e., in normal condition (step 4), the stitch data stored on the floppy disc is read out by the designated code (step 5) and the data is stored in RAM 3 being grouped by the stop code. When the stitch data becomes readable due to the generated start signal (step 7), the stitch data stored in RAM 3 is read out, one by one, and sent to the embroidery machine. Thus, stitching is performed (step 8).

When the flag is 1 (step 4) the stitch data grouped by the stop code is read out from the floppy disc by the designated discrimination code (step 9) and is stored at the specified address in RAM 3 (step 10). When priority data is to be read, e.g., when the first stitch work is finished (step 11), the stitch data is read from the specified address in RAM 3 and is transferred to the embroidery machine. Thus, the stitch work is performed (step 12).

The timing for reading the priority data can be read out after stitching the second character by counting the number of completed characters and comparing this count number with a preset completed number. When the reading of stitch data is completed (step 13), the flag changes from 1 to 0 (step 14).

Figure 3:
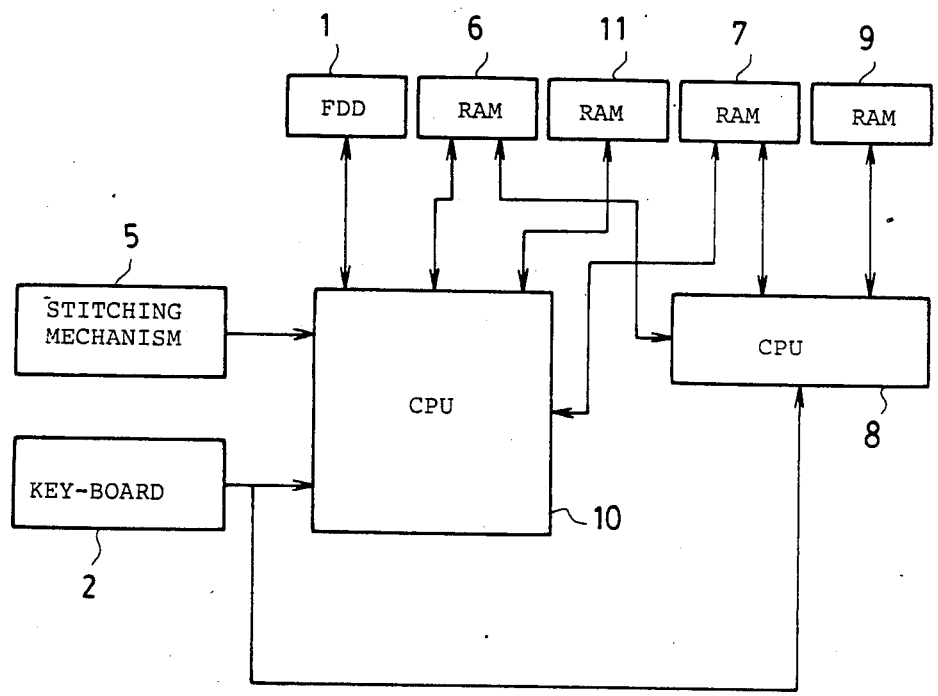
FIG. 3 is a schematic drawing according to another embodiment of the invention.

Referring to FIG. 3, another embodiment of this invention will be explained hereinafter. Numeral 6 denotes a RAM which stores the order number as a first order-number-storage-means for stitch work decided by a CPU 10 (explained later). Numeral 7 denotes a RAM which acts as a discrimination-code-storage-means by storing the discrimination code input by the keyboard 2 after stitching starts. Numeral 8 denotes a CPU which works as a second order-number-storage-means and decides the order number for characters input by keyboard 2 after stitching starts. Numeral 9 denotes a RAM and acts as a second order-number-storage-means which stores the order number decided by CPU 8.

The numeral 10 denotes a CPU. The CPU 10 works as a first order-number-decision-means by adding one to those order numbers which are stored in RAM 6 and are input by the keyboard after stitching starts. CPU 10 also works as a minimum-order-number-detection-means which detects the minimum order number among order numbers stored in RAM 6, but have not as yet been read, and further acts as a stitch-data-reading-means which reads stitch data corresponding to the character having the minimum order number. Numeral 11 denotes a RAM which stores stitch data read from said floppy disc drive (FDD) 1.

Figure 4:
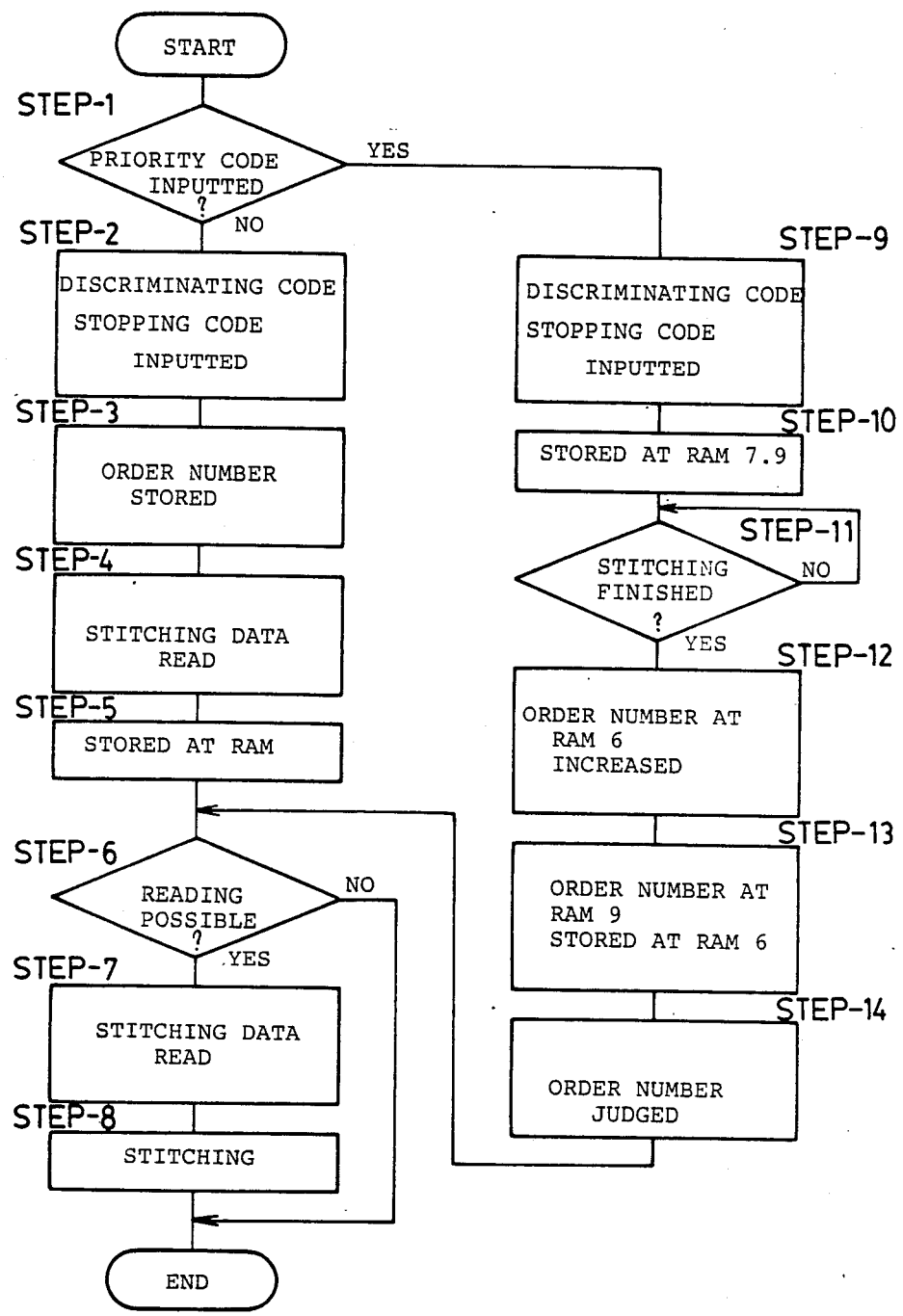
FIG. 4 is an operation flow chart according to another embodiment of the invention

Referring to the FIG. 4 "flow chart", the operation of this embodiment according to the invention will be explained. For example, before stitching (step 1), the following characters AB, CD, and EF are chosen to be stitched. Accordingly, the discrimination codes corresponding to A, B, . (stop code) C, D . (stop code) E, F . (stop code) are input from the keyboard (step 2). Stitch data corresponding to the characters are read out (step 4) from FDD (floppy disc drive) 1 and are stored in RAM 11 (step 5). At this point, order numbers are added to the characters by CPU 10 and are stored in RAM 6 (step 3). By output-code-key, the codes corresponding to A B are output and are stopped by the stop code.

When the start switch (not shown) is on (step 6), stitch work A is conducted in accordance with the stitch data stored in RAM 11 and then stitch work B is conducted. As soon as stitch work B is finished, the codes for C D are output. Thereafter, the output codes are stopped by the stop code.

After finishing C D, the stitching stops, subsequent stitch work E F is conducted, and the stitching stops again (step 7, 8). In this example, if during stitch work A B, stitch work P Q is required as the next stitch work, a discrimination code corresponding to P Q, a stop code, and an order number (e.g. 2) are input from the keyboard 2 (step 9). The discrimination code is input to RAM 7 and the order number 2 is stored in RAM 9 (step 10).

When stitch work A B is stopped (step 11) by the stop code read out by the CPU 10, the order numbers for stitch work C D and E F are each increased by 1. Thus, the order number for C D becomes 3 and the order number for E F becomes 4 (step 12). The order numbers stored in RAM 9 are then stored in RAM 6 (step 13). Among those order numbers whose stitch data have not as yet been read out, the number 2 is regarded as the smallest number (step 14). As a result, the discrimination code which is attached to P Q and is stored in RAM 7 is read by CPU 10.

The stitch data corresponding to this code is then read out from the FDD (floppy disc drive) 1 and is stored in RAM 11. When the start switch is on (step 6), the stitching of P Q in accordance with the stitch data is conducted (step 7, 8).

In this embodiment, input by a keyboard is utilized, but input by handwriting using a code converter is also applicable. Further, it is possible to input priority codes during stitch work if another auxiliary CPU and RAM is utilized. In addition to the CPU and RAM which control stitching, an auxiliary CPU and RAM may be used to input and to store data and transfer the data to the CPU and RAM at predetermined timing thus achieving the same purpose.

It is to be understood that the above-described embodiments of the invention are illustrative only and that modifications may be made thereof without departing from the scope and spirit of the invention.

What is claimed:

1. An automatic embroidery machine control device for controlling the storage and reading of a plurality of stitch data corresponding to each of a plurality of characters one at a time by a signal that forms the characters into a group and controls the stitching of each group of characters based on the grouped stitch data, comprising:

storage means for storing stitch data;

first reading means for reading stitch data as one group from said storage means according to the signal;

first memory means for storing the stitch data read by said first reading means;

second reading means for reading stitch data stored in said first memory means in the order read by said first reading means;

operation means for generating a priority signal;

second memory means for storing stitch data read from said storage means after said priority signal is generated;

third reading means initialized by said priority signal for reading stitch data from said second memory means when a group of stitch data is performed; and stitching according to the stitch data read by each of said second and third reading means.

* * * * *